United States Patent [19]

Vives

[11] 4,313,027
[45] Jan. 26, 1982

[54] ASSEMBLY FOR FIXING AN UNDERSEA CABLE TO THE HOUSING OF A REPEATER AND A METHOD OF MANUFACTURING SAID ASSEMBLY

[75] Inventor: Jean-Patrick Vives, Calais, France

[73] Assignee: Les Cables de Lyon, Lyon Cedex, France

[21] Appl. No.: 148,354

[22] Filed: May 9, 1980

[30] Foreign Application Priority Data

May 10, 1979 [FR] France ............................ 79 11855

[51] Int. Cl.$^3$ ............................................ H02G 15/14
[52] U.S. Cl. .................................. 174/70 S; 29/855; 174/74 R
[58] Field of Search ............... 174/70 S, 74; 339/101; 29/854, 855, 856

[56] References Cited

U.S. PATENT DOCUMENTS

| | | |
|---|---|---|
| 2,471,465 | 5/1949 | Van Hasselt . |
| 2,697,739 | 12/1954 | Presswell ............................ 174/70 S |
| 3,600,499 | 8/1971 | Hibbs ............................. 174/88 C X |
| 3,780,210 | 12/1973 | Rocton ............................ 174/70 S |
| 4,259,543 | 3/1981 | Oldham ............................ 174/70 S |

FOREIGN PATENT DOCUMENTS 735399  8/1955  United Kingdom .

*Primary Examiner*—Gene Z. Rubinson
*Assistant Examiner*—D. A. Tone
*Attorney, Agent, or Firm*—Sughrue, Mion, Zinn, Macpeak and Seas

[57] ABSTRACT

An assembly for fixing an undersea telecommunications cable with a central strength member (1) but no metal armouring to the housing of a repeater (2). It includes a funnel-shaped conical part (3) with a flared mouth piece, a neck 3A whose inside diameter is equal to the diameter of the cable. Said conical part is fixed to the housing of the repeater. An elongate elastomer sleeve surrounds the end of the cable up to the inner zone of the neck of said conical part and has an outside diameter which tapers gradually towards its end distant from said mouth piece. An elongate shell (8) is made of stratified glass and resin material, said material surrounding the flared end of the mouth piece of the conical part and said sleeve. An outer sleeve (9) made of braid of high tensile strength extends around the periphery of said shell, and an elevator cover (10) surrounds the aforementioned parts. Application to cables which are to be submerged to great depths.

14 Claims, 3 Drawing Figures

ASSEMBLY FOR FIXING AN UNDERSEA CABLE TO THE HOUSING OF A REPEATER AND A METHOD OF MANUFACTURING SAID ASSEMBLY

FIELD OF THE INVENTION

The present invention relates to an assembly for fixing an undersea telecommunications cable having a central strength member but no metal armouring to the housing of a repeater, and to a method of manufacturing such an assembly. It relates more particularly to an assembly for fixing the housing of a repeater to an undersea telecommunications cable which is designed to be submerged at great depths.

BACKGROUND OF THE INVENTION

Said type of undersea cable includes a central conductor formed by strands of high-strength steel wire (forming a strength member), said strands being covered by a longitudinally welded copper tube drawn down onto the strength member and has no outer metal armouring, since such armouring is only provided for cables laid in shallow coastal waters. Up till now, undersea cables could be connected to the housings of repeaters in only two ways: either by fixing the cable to the repeater by fixing the central strength member to a mechanical fixing part integral with the housing, or by reconstituting the outer metal armouring of the cable over a few tens of meters, which reduced the connection problem to that of connecting a cable having outer metal armouring.

Fixing the cable by means of the central strength member such as is described for example in British Pat. No. 1,280,439 requires a mechanical universal joint to avoid the danger of too sharp bending at the point where the cable joins the housing of the repeater, said sharp bending being due to the great difference in flexibility of the two components which are to be connected together. However, said joint is complicated and expensive to manufacture. French Pat. No. 2,319,227 describes how a cable may be fixed by means of the central strength member without using a universal joint, the fixing means including a cone which surrounds and supports the cable where it leaves the fixing system which fixes it to the casing of the repeater, the cone being rigidly connected to the casing and allowing the cable to flex more at its free end. However, such fixing is still fairly complex and takes a relatively long time to perform.

As for reconstituting an outer armouring on a cable which initially had no such armouring, this requires specialized machines and can be performed only in a factory. Therefore, repairs during laying become very difficult.

The present invention aims to remedy these drawbacks and to allow a cable to be fixed to the housing of a repeater by means of simple inexpensive parts which can be prepared in advance; this enables repairs to be made even on board a cable-laying ship which has no special machines.

SUMMARY OF THE INVENTION

The present invention provides an assembly for fixing an undersea telecommunications cable having a central strength member but no metal armouring to the housing of a repeater, the assembly including: a funnel-shaped conical part with a flared mouth piece; a neck whose inside diameter is substantially equal to the outside diameter of the cable; means for fixing said conical part to the housing of the repeater; an elongate elastomer sleeve which surrounds the end of the cable up to the inner zone of the neck of said conical part and whose outside diameter tapers gradually towards its end distant from said mouth piece; an elongate shell made of stratified material comprising glass fibres and settable resin, said fibres surrounding the flared end of the mouth piece of the conical part and said sleeve; an outer sleeve made of braided metal wire or of a braided plastics material of high tensile strength, said outer sleeve extending around the periphery of said elongate shell; and an elastomer cover which surrounds the aforementioned parts of the end of said conical part fixed to the housing of the repeater at the furthest end of the braided outer sleeve from the housing of the repeater.

It also preferably includes at least one of the following features:

A metal ring which surrounds the mouth piece of said conical part while the elongate shell made of stratified material has a shoulder whose profile corresponds to that of said metal ring, said shoulder being on the outer portion of the end nearest the flared end of said mouth piece;

The metal ring is toroidal;

The metal ring has a wedge-shaped cross-section whose tapering end points away from the housing of the repeater;

The wires of the outer sleeve are knotted in loops round the neck of the funnel-shaped conical part.

The funnel-shaped conical part is made of stratified material comprising glass fibres and a settable resin.

The funnel-shaped conical part with a flared mouth piece, the elongate elastomer sleeve which surrounds the end of the cable up to the inner zone of the neck of said conical part, the elongate shell made of stratified material and the outer sleeve made of braided metal wire or of a plastics material, and the metal ring if used are joined together in a preformed component; and The space between the outer surface of the funnel-shaped conical part and the inner surface of the cover is filled with a sealing material.

The invention also provides a method of manufacturing said assembly, comprising the assembly of:

(a) a funnel-shaped conical part with a flared mouth piece, the neck of said conical part having an inside diameter which is substantially equal to the diameter of the cable;

(b) a bulb-shaped elongate elastomer sleeve with an inner bore whose diameter is slightly greater than the diameter of the cable to be connected and whose outside diameter tapers towards that end of it which is to be inserted in the flared mouth piece of said conical part as to mate the internal shape of said mouth piece, said outside diameter tapering gradually down to its other end;

(c) an elongate shell made of a stratified material comprising glass fibres and a settable resin, said shell being intended to surround the flared end of said conical mouth piece and said elongate sleeve;

(d) an outer sleeve made of braided metal wire or of a plastics material of high tensile strength, said outer sleeve extending round the periphery of said elongate shell; and wherein an elastomer cover is fitted onto the end of the cable at a distance from said end, which distance is sufficient to allow the assembly formed by the conical part, the elongate sleeve, the elongate shell and the outer sleeve to be fitted on said end; wherein said assembly is fitted on said end of the cable up to some distance from said end; wherein the inner and outer conductors of the cable are connected to the repeater housing; wherein said assembly is returned towards the end of the cable until the end of said conical part comes into contact with the housing of the repeater and said conical part is fixed to said housing; wherein the outer sleeve is pulled over the cable so as to clamp it in the fixing position on the housing of the repeater; wherein said outer sleeve is fixed on the cable and made stationary thereon by hooping; wherein the elastomer cover is slid on the braided outer sleeve until it comes into contact with the outer surface of said conical part near the housing; and wherein said cover is fixed to the outer surface of said conical part.

A fixing assembly in accordance with the invention and a method of manufacturing it are described hereinbelow by way of example and with reference to the figures of the accompanying drawings.

DESCRIPTION OF THE PREFERRED EMBODIMENTS

Figure 1:
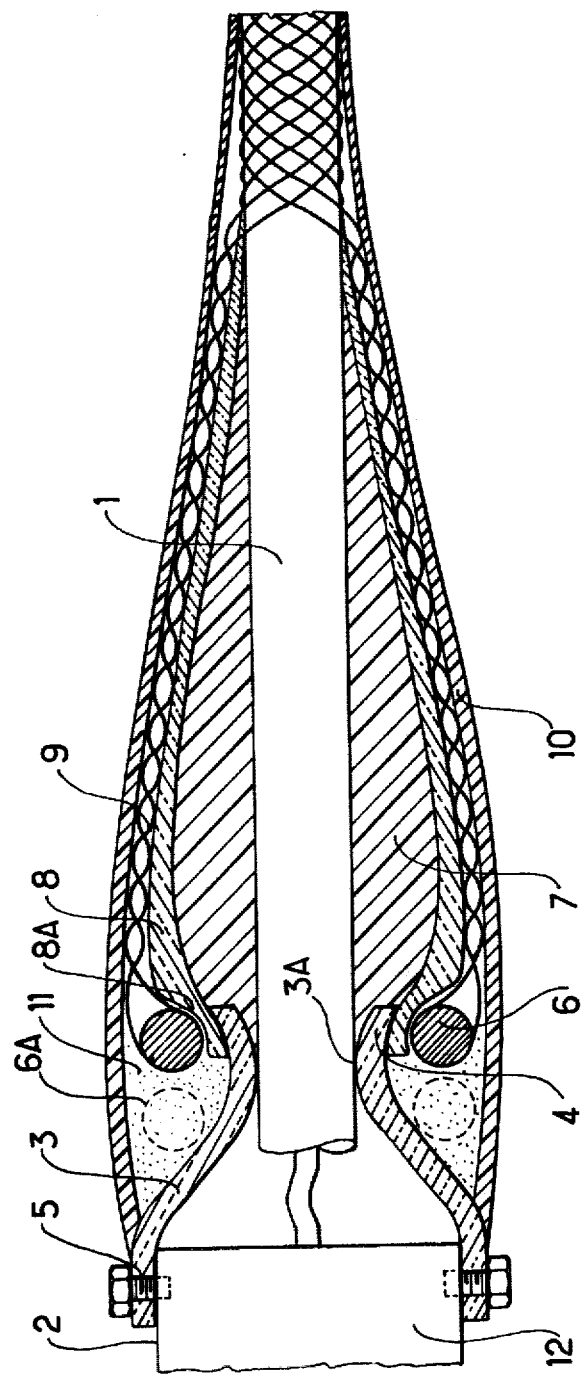
FIG. 1 illustrates an axial cross-section of a fixing arrangement which includes a toroidal metal ring of a circular cross-section.

In FIG. 1, an undersea cable 1 is connected to the housing of a repeater having an integral metal end part 2. Firstly, a conical funnel-shaped part 3 is made of a stratified material made of glass fibres and epoxy or polyester resin so that its large-diameter end has a cylindrical portion which can engage a corresponding shoulder of the end part 2 of the housing. Said cylindrical portion is provided with holes which allow it to be fixed on the end part 2 by means of bolts 5 when being assembled onto the repeater.

The other end of the conical part 3 has a mouthpiece 4 which is slightly outwardly flared beyond a neck 3A.

A toroidal moulded or machined metal ring 6 is then slid over said flared portion of the part 3 and abuts against the frusto-conical outer portion, as shown at 6A. When it is in place, an elongate generally bulb-shaped neoprene rubber sleeve 7 is slid onto the end of the part 3. The inside diameter of the sleeve 7 is slightly greater than that of the cable to be connected, and the major length of the sleeve tapers away from the housing. Also the end of the sleeve adjacent to the housing is tapered conically to be able to engage in the flared mouth piece 4 of the funnel 3.

An elongate shell 8 is then prepared. It is made of a stratified material which consists of layers of glass fibres and of epoxy resin or polyester resin and it is prepared by making it straddle the flared end of the part 3 and making it cover the outer surface of the elongate sleeve 7 so than when the resin impregnates the glass fibres and hardens, said shell is held by the flared end 3 and traps the sleeve 7, these three parts then forming an inseparable sub-assembly or component.

The torodial ring 6 is also trapped between the funnel-shaped conical portion of the part 3 and a shoulder 8A formed on the end of the shell 8 (while maintaining a limited possibility of moving longitudinally), said shoulder having a hollow matching the shape of the adjacent portion of the outer surface of the ring 6.

Then, an outer sleeve 9 is manufactured, using aromatic polyamide wires, e.g. those commercialized under the trademark "Kevlar", or else metal wires (e.g. steel wires) which are sufficiently flexible to be braided after being suitably protected against sea water corrosion. To manufacture said braid, the assembly formed by the parts 3, 6, 7 and 8 is assembled on a support or "mandrel" in the axis of a multiple-head braiding machine or stranding machine, at a distance greater than the length of the braid to be formed. Then a wire is drawn from the reel of every other one of the multiple heads; said wire passes round the ring 6 over the surface of the shell 8 and is returned to the stranding machine where it is attached to an empty reel of another moving head. If the stranding machine includes 2n rotating heads, there will be n "Kevlar" (or steel) wires which go to and fro between the stranding machine and the toroidal ring inserted between the funnel 3 and the shell 8. The stranding machine is then started up and the outgoing and return wires are grouped together in a strand the n strands themselves being intermixed to form a braid 9 which covers the shell 8 and extends beyond its free end over a distance of a few meters, thereby constituting the braided outer sleeve which subsequently clamps the cable. Once the braid is formed, the wires which are connected to the stranding machine are cut and the ends of said braid are bound to prevent the braiding from coming apart.

The sub-assembly formed by the parts 3, 6, 7, 8 and 9 is then stored until it is to be used.

When one end of the cable 1 is connected to the housing of a repeater, firstly, a generally frustoconical elastomer cover 10 made e.g. of neoprene rubber, is fitted onto the end which is to be connected. Said cover is moved back far enough along the cable for the preformed assembly formed by the parts 3, 6, 7, 8 and 9 also to be fitted far enough along the cable for it to be possible to electrically connect the inner and outer conductors in a known manner to the housing of the repeater. Then the sub-assembly formed by the parts 3, 6, 7, 8 and 9 is fitted on the cable 1 and the inner and outer conductors are connected. Once this is done, the assembly formed by the parts 3, 6, 7, 8 and 9 is slid on the cable towards the repeater until the cylindrical collar of the funnel-shaped part 3 straddles the shoulder of the fixing part 2 and the part 3 is fixed on the part 2 by bolts 5. The braided sleeve 9 is then pulled over the cable so that the braided sleeve clamps the cable in its final position by exerting a sufficient retaining force. The end of the braided sleeve that is distant from the housing of the repeater is then held stationary on the cable by a hoop (said end and the hoop not being illustrated) and the neoprene rubber cover 10 is slid over the braided sleeve 9 and the shell 8 until it comes into contact with the outer surface of the funnel-shaped part 3 in the neighbourhood of the metal part 2, then the cover is fixed to the part 3 by gluing in the contact zone. The inside space which lies between the part 3, the shell 8 and the cover 10 is then filled with sealing material 11 such as grease or a polymerisable material such as a resin so as to protect the end of the braid and the toroidal ring 6 against corrosion by sea water.

The required length of braided sleeve disposed round the cable to exert the necessary retaining force may be calculated in a known manner. The retaining force C is equal to $C = C_o e^{-kx}$
where x is the length of braided sleeve in contact with the cable, $C_o$ is the initial force and the exponent k is calculated by the formula:

$$k = 2 \frac{\mu t_g^2 \alpha}{D_o}$$

where $\alpha$ is the half-angle of two wires which form a mesh of the braided sleeve, $\mu$ is the coefficient of friction of the braid on the cable, and $D_o$ is the average diameter of the sleeve braided round the cable.

In practice, the total length of the braid is about ten meters.

Of course, the dimensions of the braided sleeve must be calculated so that the shearing stress on the sleeve does not at any point exceed the maximum shearing stress which the various layers of the cable can withstand.

Figure 2:
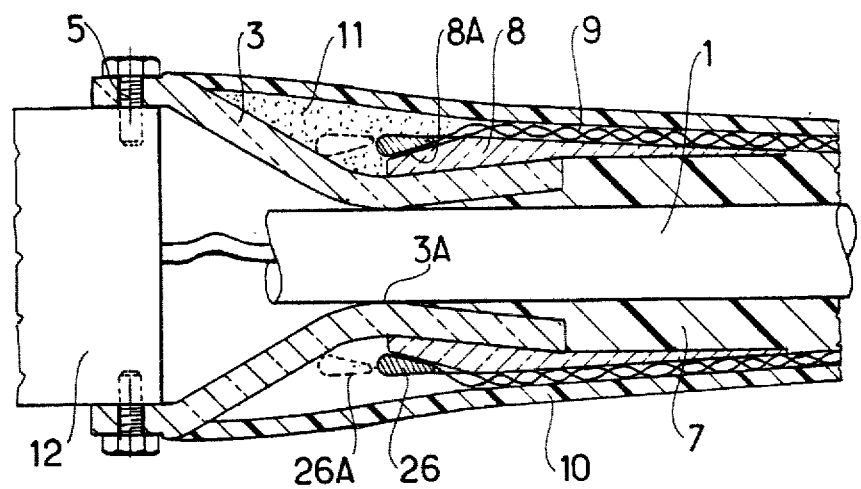
FIG. 2 illustrates an axial cross-section of a portion of the fixing assembly in the neighbourhood of a toroidal metal ring of a wedge-shaped cross-section.

FIG. 2 illustrates a fixing assembly which is analogous to that in FIG. 1 but in which the toroidal ring 26 has a wedge-shaped cross-section and presses against a conical bearing surface 8A of the elongate shell 8 after being placed initially in the position 26A.

Figure 3:
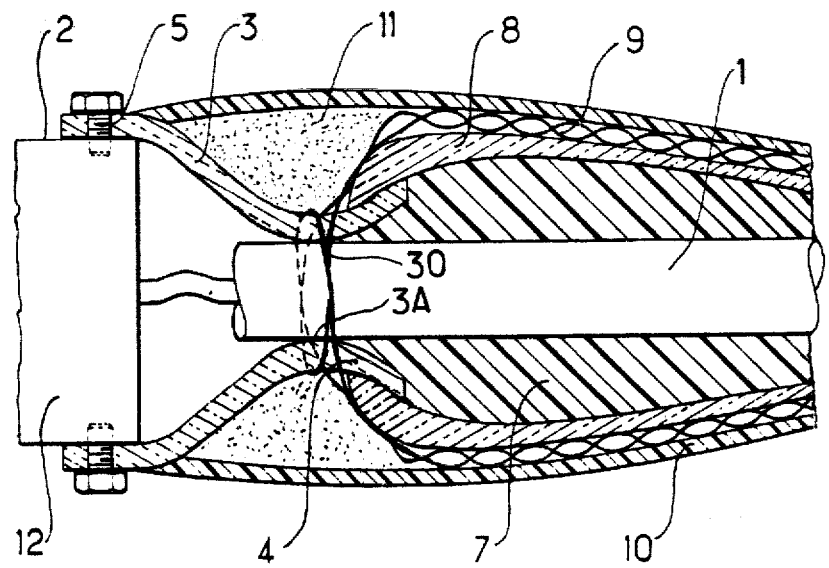
FIG. 3 illustrates an axial cross-section of a fixing arrangement analoguous to those of FIGS. 1 and 2 but not including any toroidal ring, the end of the braided sleeve being knotted round the neck of the funnel-shaped part.

FIG. 3 illustrates a fixing assembly which is analogous to those in FIGS. 1 and 2 but which does not include a toroidal ring. Each component wire of the braided sleeve forms a loop such as 30 which is knotted round the neck of the funnel-shaped part 3 like a lasso, so that the loop tightens when the two ends of the wire are subjected to a tractive force.

Although the fixing assemblies and the method of manufacturing them which are described with reference to the figures appear preferable, it will be understood that various modifications can be made thereto without going beyond the scope of the invention, some components of the assemblies or some operations of the method possibly being replaced by others which perform an analogous technical function. In particular, the shape of the cross-section of the toroidal ring may be different, e.g. oval. Said ring may be manufactured in two halves which can be assembled by nuts and bolts. Then, the funnel-shaped part 3 and the shell 8 may constitute a single part which traps the elastomer sleeve 7.

I claim:

1. An assembly fixing an undersea telecommunications cable having a central strength member but no metal armouring to the housing of a repeater, the assembly including:
    a funnel-shaped conical part having a flared mouth piece extending from a neck whose inside diameter is substantially equal to the outside diameter of the cable;
    means fixing said conical part to the housing of the repeater;
    an elongate elastomer sleeve which surrounds the end of the cable up to the neck of said conical part and whose outside diameter tapers gradually towards its end remote from said mouth piece;
    an elongate shell made of stratified material comprising glass fibres and settable resin, said fibres surrounding the flared mouth piece of the conical part and said sleeve;
    an outer braided sleeve of high tensile strength, said outer sleeve extending around the periphery of said elongate shell;
    and an elastomer cover surrounding the aforementioned parts and being fixed at one end to the housing of the repeater and extending to the furthest end of the braided outer sleeve from the housing of the repeater.

2. An arrangement assembly to claim 1, further including a metal ring which surrounds the mouth piece of said conical part, and wherein the elongate shell made of stratified material has a shoulder whose profile corresponds to that of said metal ring, said shoulder being on the outer portion of the end of the shell nearest the flared mouth piece.

3. An assembly according to claim 2, wherein the metal ring is toroidal and has a circular cross-section.

4. An assembly according to claim 2, wherein the metal ring has a wedge-shaped cross-section whose tapering end points away from the housing of the repeater.

5. An assembly according to claim 1, wherein the wires of the outer sleeve are knotted in loops round the neck of the funnel-shaped conical part.

6. An assembly according to claim 1, wherein the funnel-shaped part is made of stratified material comprising said glass fibres and said settable resin.

7. An assembly according to claim 1, wherein the funnel-shaped conical part with a flared mouth piece, the elongate elastomer sleeve which surrounds the end of the cable up to the neck of said conical part, the elongate shell made of stratified material and the outer braided sleeve are all joined together.

8. An assembly according to claim 1, wherein the space between the outer surface of the funnel-shaped conical part and the inner surface of the cover is filled with a sealing material.

9. A method of manufacturing an assembly comprising:
    (a) a funnel-shaped conical part with a flared mouth piece extending from a neck, said neck having an inside diameter which is substantially equal to the diameter of a cable to be connected to a repeater housing;
    (b) a bulb-shaped elongate elastomer sleeve with an inner bore whose diameter is slightly greater than the diameter of the cable to be connected and whose outside diameter tapers towards that end of it which is to be inserted in the flared mouth piece of said conical part as to mate the internal shape of said mouth piece, said outside diameter tapering gradually down to its other end;
    (c) an elongate shell made of a stratified material comprising glass fibres and a settable resin, said shell surrounding the flared mouth piece and said elongate sleeve;
    (d) an outer sleeve of high tensile strength, said outer sleeve extending around the periphery of said elongate shell;
    said method comprising the steps of:
        fitting an elastomer cover onto the end of the cable at a distance from said end, which distance is sufficient to allow a sub-assembly formed by the conical part, the elongate sleeve, the elongate shell and the outer sleeve to be fitted on said end;

fitting said sub-assembly on said end of the cable up to some distance from said end;

connecting the inner and outer conductors of the cable to the repeater housing;

returning said sub-assembly towards the end of the cable until the end of said conical part comes into contact with the housing of the repeater; fixing said conical part to said housing;

pulling the outer sleeve over the cable so as to clamp the cable in the fixing position on the housing of the repeater;

fixing said outer sleeve on the cable and making it stationary thereon by hooping;

sliding the elastomer cover on the braided outer sleeve until it comes into contact with the outer surface of said conical part near the housing; and fixing said cover to the outer surface of said conical part.

10. A method according to claim 9, further comprising the step of disposing a metal ring around the neck of said conical part and also assembling the ring with said conical part, said elongate sleeve, said elongate shell and said outer sleeve; providing the outer portion of the end of said elongate shell nearest the flared mouth piece of the conical part with a shoulder whose profile corresponds to that of the metal ring; and passing said outer braided sleeve by making its wires pass around said metal ring.

11. A method according to claim 9, wherein the wires of said outer sleeve are formed as loops which are knotted round the neck of said conical part.

12. A method according to claim 9, wherein the conical part and the elongate shell are simultaneously preformed in a single part made of stratified material comprising glass fibres and resin.

13. A method according to claim 12, wherein said single part is surrounded by a toroidal ring in the neighbourhood of its neck, said ring being constituted by two mechanically assembled half-rings.

14. A method according to claim 9, wherein the space between the neck of said conical part and the inner surface of said elastomer cover is filled with sealing material before said cover is fixed to said conical part.

* * * * *